Dec. 12, 1939.   F. L. BOOKWALTER   2,183,511
ROTARY SEED CLEANER
Filed Dec. 17, 1938   2 Sheets-Sheet 1

Inventor
Frank L. Bookwalter
By Clarence A. O'Brien
and Hyman Berman
Attorneys

Dec. 12, 1939.  F. L. BOOKWALTER  2,183,511
ROTARY SEED CLEANER
Filed Dec. 17, 1938  2 Sheets-Sheet 2

Inventor
Frank L. Bookwalter
By Clarence A. O'Brien
and Hyman Berman
Attorneys

Patented Dec. 12, 1939

2,183,511

UNITED STATES PATENT OFFICE 2,183,511

ROTARY SEED CLEANER

Frank L. Bookwalter, Versailles, Ohio

Application December 17, 1938, Serial No. 246,431

1 Claim. (Cl. 209—285)

This invention relates broadly to apparatus designed for removing weed seed from wheat and other small grain.

An object of the present invention is to improve over seed cleaning machines such as now generally used and which consist, for the most part, of shaker screens.

In accordance with the present invention the seed cleaner is characterized by an arrangement of rotary cylindrical screens for separating the weed seed from the wheat or other small grain.

Figures 1, 2:
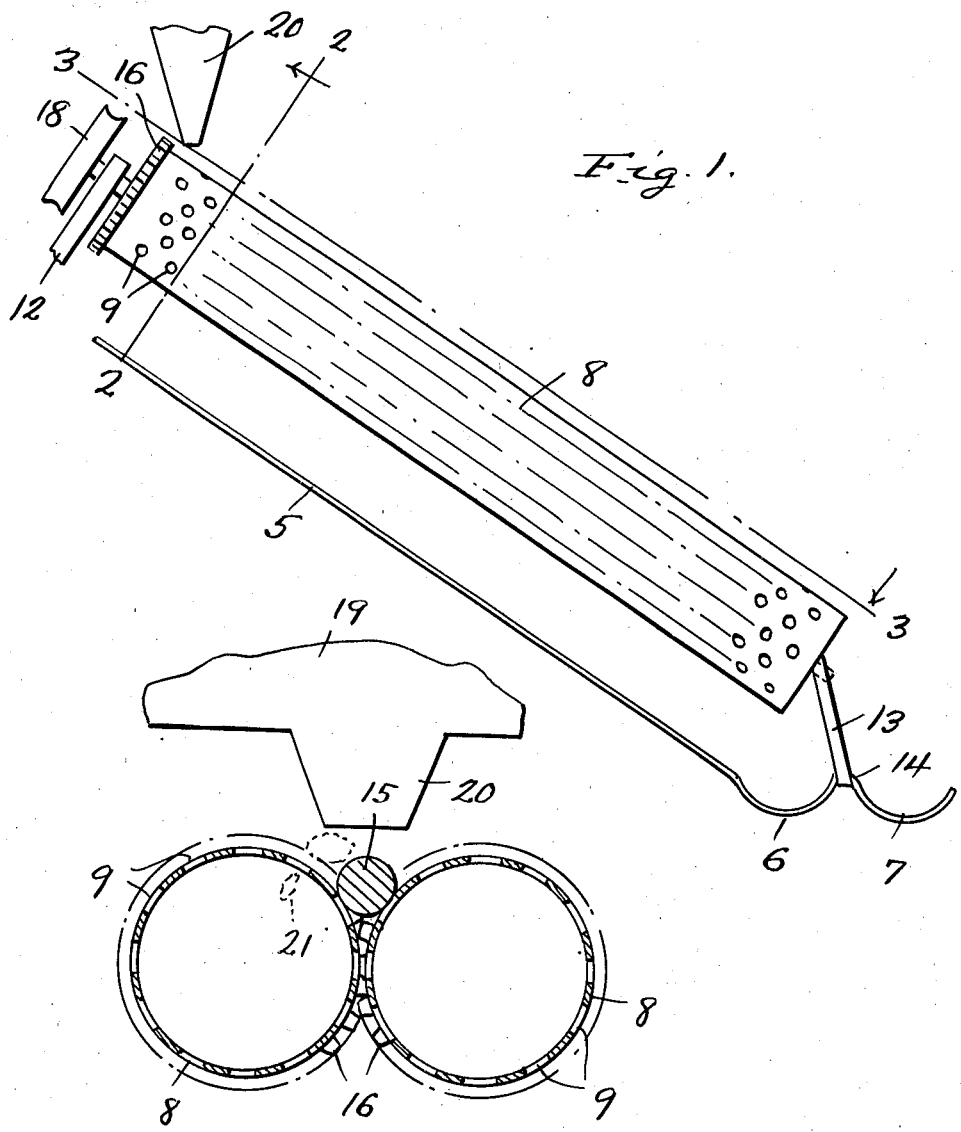

The invention together with its objects and advantages will be best understood from a study of the following description taken in connection with the accompanying drawings wherein:

Figure 1 is a side elevational view of the invention.

Figure 3:
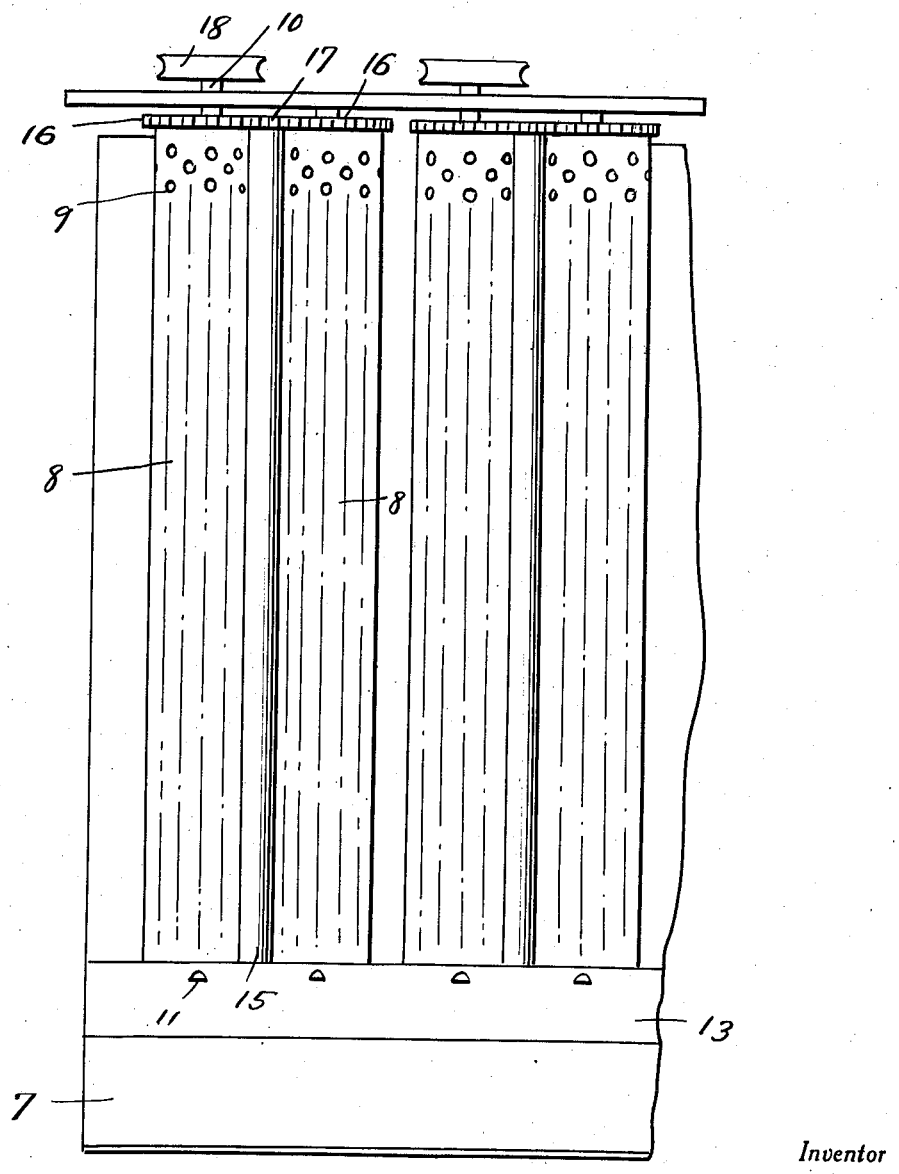

Figures 2 and 3 are sectional views taken substantially on the lines 2—2 and 3—3, respectively, of Figure 1.

Referring more in detail to the drawings it will be seen that the seed cleaner of my invention, in accordance with the preferred embodiment thereof comprises a tray or pan 5 disposed at a suitable incline and supported in any suitable manner. At the lower end thereof the pan or tray 5 is formed with a pair of integral parallel troughs 6 and 7 that extend from one side edge to the opposite side edge of the pan 5.

Disposed above the pan 5 and arranged in parallelism thereto are a plurality of pairs of cylindrical screens 8.

The pairs of screens are suitably spaced, and the screens 8 of each pair are arranged in close proximity to one another.

The screens 8 are formed of metal tubes perforated as at 9. The size of the perforations 9 will depend upon the size of the weed seed to be removed from the wheat or other grain.

Each of the screens 8 is provided at the ends thereof with spindles 10 and 11, the spindles 10 being journaled in a suitable support 12 therefor while the spindles 11 are journaled in a suitable support 13 that in turn is supported by the dividing wall 14 of the troughs 6 and 7.

Also associated with each pair of screens 8 is a dividing rod 15 that extends longitudinally of the screens 8 and is positioned between the peripheries of the screens at the top sides of the screens, and substantially in contact with the peripheries of the screens as best shown in Figure 2. Preferably the dividing rod 15 is cylindrical and is of course of materially less diameter than the screens.

Also, the screens of each pair, and the dividing rod 15 associated with the pair of screens are provided at one end thereof with gears 16 and 17 respectively that are in constant mesh as shown.

Also the spindle 10 associated with a screen 8 of each pair of screens is provided with a pulley wheel 18 through the medium of which and a suitable drive belt drive from a suitable source of power is transmitted directly to one screen of the pair. Obviously through the medium of the gear pair, gearing 16 and 17 the screens 8 of each pair, together with the associated dividing rod 15 are caused to rotate simultaneously, a screen 8 of each pair of screens rotating reversely or in a direction opposite to the direction of rotation of the complemental screen of the same pair.

Also provided at the upper end of the cleaner is a trough 19 for the grain, and the trough 19 has extending from the bottom thereof discharge spouts 20, there being one spout 20 for each pair of screens.

In practice the seed from the wheat or other grain is placed in the hopper 19 and discharges therefrom through the spouts 20 onto the screens 8. Obviously the divider rod 15 associated with each pair of screens will cause the seed to separate, some of the seed thus separated passing onto the periphery of one of the screens while the other of the seed will be directed onto the periphery of the other screen 8 of the pair. The larger seed 21 will travel lengthwise of the screens 8 to fall therefrom into the trough 7 while the smaller or weed seed 22 will, as shown in Figure 2, separate from the larger seed and pass through the perforations 9 in the peripheries of the screens 8, ultimately discharging also through the perforations 9 onto the inclined tray 5 and ultimately accumulate in the trough 6 at the bottom end of the tray 5.

Thus it will be seen that the smaller or weed seed may be readily separated from the grain so that only the larger or more desirable grain seed will collect in the trough 7.

It is thought that a clear understanding of the construction, operation, utility and advantages of a seed cleaner embodying the features of the present invention will be had without a more detailed description.

Having thus described the invention what is claimed as new is:

A seed cleaner comprising a sloping tray having inner and outer parallel troughs at its bottom, said troughs extending transversely, an upright having its lower edge connected with the adjacent side edges of the troughs, said upright separating the troughs, a pair of inclined cylinders having perforations therein, a centrally arranged pintle for the lower end of each cylinder supported by the upper portion of the upright, pintles connected with the upper ends of the cylinders, means for rotatably supporting the upper pintles, means for rotating one of the upper pintles, said cylinders being parallel to each other and arranged close together, means for introducing the material to be separated at the upper part of the space between the cylinders, a rod extending through said space and in contact with the cylinders and means for rotating the second cylinder from the driven cylinder, the material passing through the perforations in the cylinders dropping into the inner trough and the material passing down the space between the cylinders dropping into the outer trough.

FRANK L. BOOKWALTER.